United States Patent Office 2,889,225
Patented June 2, 1959

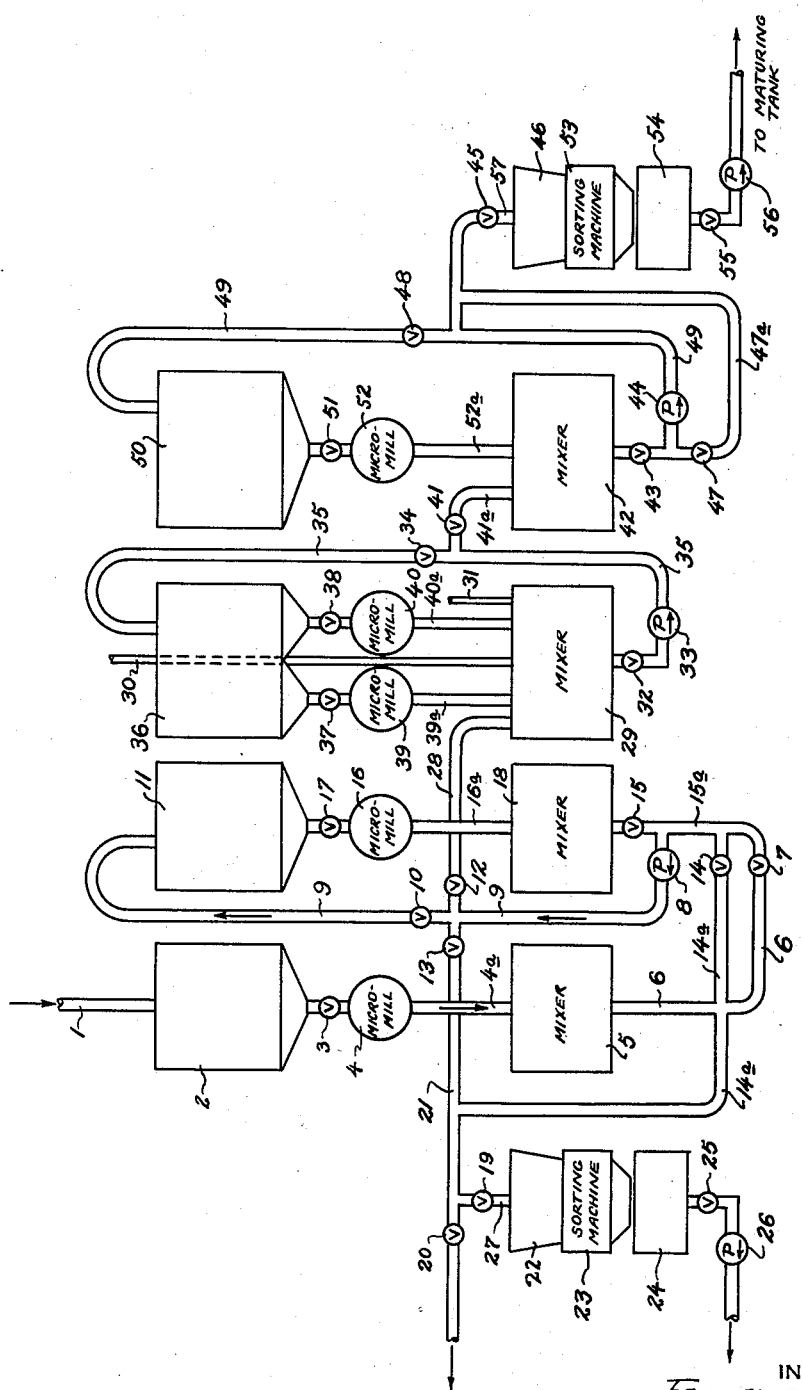

2,889,225

METHOD AND APPARATUS FOR THE PRODUCTION OF CHOCOLATE MASSES

František Palík, Olomouc, Czechoslovakia, assignor to Zora, továrna na čokoládu a cukrovinky, narodní podnik, v Olomouci, Olomouc, Czechoslovakia Application March 26, 1956, Serial No. 573,771

Claims priority, application Czechoslovakia March 26, 1955

3 Claims. (Cl. 99—23)

The present invention relates to a method and apparatus for the production of a chocolate mass.

The known process for the preparation and refining of chocolate masses, presently used all over the world, is very uneconomical and therefore also costly, and always requires an exceedingly long time for its completion. It is worth mentioning that the last stage of the final refining, the so-called "conching" process, of the chocolate mass takes from 48 to 72 hours, and sometimes even more.

In this existing process, the raw cocoa beans are first freed from foreign admixtures and then roasted so as to facilitate the separation of the kernels from the husks during the following crushing process.

The roasted cocoa beans are then crushed in a special machine and husked, and the clean kernels are then ground either between stones or between steel rollers which have proved far more suitable for this purpose.

This special machine differs from the normal friction machine only in that it is provided with relatively small diameter grooved rollers or grooved discs for preliminary crushing of the cocoa pulp to a paste-like mass, as otherwise the main steel rollers would not engage and feed the cocoa pulp.

The ground cocoa mass is then heated for several hours while being continuously agitated in order to make the cocoa cells, affected by the grinding process, set free the cocoa butter and thus to liquify the mass to a higher extent.

The cocoa mass prepared in this way is then mixed with finely ground sugar, usually in mixers of the kind referred to as melangers. The mixing operation is continued until perfect plasticity is achieved.

From the mixer the raw and plastic chocolate mass proceeds to a grinding operation on high speed five-roller friction-machines where it is subject to a further smoothing procedure. The mass usually is subject to the rolling action only once or, in special cases, twice.

The loose chocolate mass proceeds from the friction machines directly to the refining or conching process, during which, in some types of conchers, a further partial smoothing process takes place, while under the influence of atmospheric oxygen new flavoring and aromatic substances are gradually produced according to the type of the conchers used.

As previously indicated, this phase of the existing process takes 48 to 72 hours and has to proceed continually at a constant temperature. Prior to the termination of the conching period the temperature is allowed to drop slightly and only then is the mass discharged into molds which are deposited in a heating chamber, where the mass slowly cools to the temperature of the heating chamber within the range of 35° to 36° centigrade.

A disadvantage of the conching phase of the above described existing process is the slow contact of the atmospheric oxygen with the cocoa substance, which results from the fact that the cocoa butter has the tendency to perpetually cover or surround the cocoa substance and thereby decreases the possibility of contact of the oxygen with the tannic substances present, and this is also the reason, why the whole refining process, if it is to be perfect, may take even 3 to 4 days, with correspondingly excessive costs for the manufacturing process.

Further, the presence of water in the chocolate mass, particularly when the latter is used for coating, is highly undesirable. In the first place the water increases the viscosity of the coating, makes machine dipping difficult and gives the coatings a reddish color, undulated surface, and decreased shine. The reduction of the water content results in an increase in the liquidity of the mass and therefore also in savings of cocoa butter. It has been found that, by reducing the moisture from 0.54% to 0.15% two percent of cocoa butter are saved. However, in manufacturing plants employing the above described existing process, water can be removed only with great difficulty. In favorable situations, it is possible to reduce the water to 0.7%, but usually the coatings contain around 1% of water and milky masses, or even 2%, which has a greatly unfavorable influence on the appearance of the produced goods.

The above description of the existing manufacturing process shows that the entire process of production is divided into a number of production stages, which are not linked in such a way as to represent a continual process; but which rather form independent sections, and passage from one operation to another requires the efforts of a great number of workers, and necessarily involves considerable production losses in valuable raw materials.

It is an object of the invention to provide a method and apparatus for the production of chocolate masses which avoid the above mentioned disadvantages of the existing process while providing masses of high quality, and which further facilitate the complete removal of water, in particular from the chocolate coatings, so as to achieve the saving of at least 2% of cocoa butter.

Further, it is an object of the invention to provide a method and apparatus of the described character having the following functional capabilities:

To break up the cocoa kernels in the quickest possible way so as to set free all cocoa butter enclosed in the cocoa cells;

To free the cocoa mass of husks and any other foreign undesirable admixtures, which adhere to the cocoa pulp and which in the above described existing manufacturing process cannot be removed, so that they are then ground, and in this way thicken and depreciate the cocoa mass;

To achieve the refinement of the cocoa mass in the quickest possible way;

To achieve good homogeneity and fineness of the chocolate mass in the quickest possible way;

To dispense with the long conching period so that the process can be completed in a normal working day;

To remove all water from the cocoa mass in the quickest possible way;

To provide for the correct temperature of the chocolate mass in such a way as to eliminate the danger of discoloration of the finished product;

To eliminate the necessity of manual labor and to permit mechanisation of the process;

To remove production losses and to render the process absolutely hygienic;

To achieve a substantial reduction in the consumption of electric energy and heating steam;

To radically reduce initial costs for plant and equipment;

To achieve a proportionate reduction in working space; and

To shorten the time required for the production process as far as possible.

Referring to the drawing in detail, it will be seen that the production apparatus or plan employed in connection with the practice of the method embodying the present invention includes a pipe or line 1 through which cocoa pulp may be supplied to a container 2. The container 2 has an outlet controlled by a valve 3 and communicating with the feeding worms of a micromill 4 hereinafter described in detail. A discharge pipe 4a leads from micromill 4 to a mixer 5, and a discharge pipe 6 extends from the mixer 5 and has a valve 7 interposed therein. A pipe 14a intersects, and communicates with the discharge pipe 6 at a location along the latter between the valve 7 and the mixer 5, and the pipe 14a has a valve 14 interposed therein.

The pipes 6 and 14a both open into a pipe 15a, and a pipe or line 9 branches off from the pipe 15a and has a pump 8 and a valve 10 successively interposed therein.

The pipe or line 9 opens into a receiving container 11 which has a discharge outlet controlled by a valve 17 and opening into a micromill 16. The micromill 16 has a discharge pipe 16a opening into a mixer 18, and the discharge outlet of the latter communicates with the pipe 15a and is controlled by a valve 15.

A pipe 21 branches off from the pipe or line 9 at a location between pump 8 and valve 10 and has two spaced apart valves 13 and 20 interposed therein, with the pipe 14a being connected to the pipe 21 at a location between the valves 13 and 20. Further, a pipe 27 extends from a pipe 21 at a location between valve 20 and the connection of pipe 21 to pipe 14a, and a control valve 19 is interposed in the pipe 27.

The pipe 27 opens into a container 22 of a sorting machine 23 which is hereinafter described in detail, and which is operative to sort out or remove the fine particles from the cocoa mass.

The fine particles sorted out from the cocoa mass are discharged into a storage tank 24 having a discharge pipe with a control valve 25 and a pump 26 interposed therein.

A pipe 28 also branches off from the pipe or line 9 at a location between pump 8 and valve 10, and the pipe 28 has a control valve 12 interposed therein and opens into a mixer 29. A supply pipe 30 also opens into the mixer 29 and is adapted to supply the ingredients, such as, the powdered sugar, cocoa butter or dried milk, which are to be mixed with the refined cocoa mass in order to produce a chocolate mass. A discharge pipe 35 extends from the mixer 29 and has a control valve 32, a pump 33 and a control valve 34 successively interposed therein. The discharge pipe 35 opens into a storage container 36 having dual discharge outlets controlled by valves 37 and 38 and communicating with micromills 39 and 40, respectively. The micromills 39 and 40 have discharge pipes 39a and 40a, respectively, which also open into the mixer 29.

A pipe 41a branches off from the pipe 35 intermediate the pump 33 and the valve 34, and a control valve 41 is interposed in the pipe 41a which opens into a mixer 42. The mixer 42 has a discharge outlet controlled by a valve 43 and communicating with both a pipe 47a having a valve 47 interposed therein, and with a pipe 49 having a pump 44 and a valve 48 successively interposed therein. The pipe 49 opens into a receiving container 50 having an outlet controlled by a valve 51 and opening into a micromill 52 having a discharge pipe 52a opening into the mixer 42. A pipe 57 branches off from the pipe 49 at a location intermediate the pump 44 and the valve 48, and a valve 45 is interposed in the pipe 57. The pipe 47a opens into the pipe 57 at a location along the latter between the valve 45 and the connection of pipe 57 to the pipe 49.

The pipe 57 opens into a container 46 of a sorting machine 53 which is hereinafter described in detail, and which is operative to sort out the fine particles of the chocolate mass for discharge from the sorting machine 53 into a storage container 54. The storage container 54 has a discharge pipe with a control valve 55 and a pump 56 interposed therein for feeding the refined chocolate mass to a maturing tank (not shown).

The method embodying the invention and employing the above described apparatus is not continuous. It is possible to treat or produce up to 1,000, 2,000, 5,000 or more kilograms of cocoa or chocolate mass in one batch depending on the size of the containers and mixers that are available. The smaller these containers and mixers are, the more individual operations become necessary if a certain total output is required. The method embodying the invention proceeds as follows employing the above described apparatus therefor:

The desired quantity of pure cocoa pulp received from husks and weighed on an automatic scale is passed through line 1 to cocoa pulp container 2 and through slide valve 3 directly to the feeding worms of micromill 4 where the pure cocoa pulp is thoroughly crushed by hammers rotating at a high circumferential velocity, for example, 91 m./sec. The crushing hammers are loosely suspended from discs which rotate counterclockwise. The crushed cocoa pulp is thrown against the rifled inner wall of the upper cover of the crushing unit of the micromill 4, where it is crushed again and from where it is finally thrown against a perforated sieve enclosing the lower part of the crushing unit. This sieve has openings, the diameter of which is 4–6 mm. so that the sieve offers no great resistance to the passage therethrough of the crushed pulp, especially when moist cocoa pulp is crushed. The result of the first crushing of cocoa pulp is a liquid cocoa mass which drops through the sieve into mixer 5 where it is kept in motion until it is pumped to the next machine. As soon as about 60% of the cocoa pump batch is crushed in the micromill 4, the cocoa mass is pumped by pump 8 to pass through open valve 7, line 9, and open valve 10 into the receiving container 11 of the second micromill 16. During this pumping action, the crushing system of micromill 16 is set in operation, with the valve 17 and the valves 12, 13, 14, 15 remaining closed.

After the crushing of the cocoa pulp in the micromill 4 the last quantities of the cocoa mass are discharged from the mixer 5. The valve 7 is now closed and another portion of the cocoa pulp is passed through the line 1 into the receiving container 2 for crushing. In the meantime, the cocoa mass from the container 11 passes through the open valve 17 and the micromill 16 into the mixer 18 where further refinement and liquefaction take place. Simultaneously, the pump 8 is put in operation and the cocoa mass is recirculated about four more times through the micromill unit 16, thereby passing through the open valve 15, the pump 8, line 9, and reentering the container 11, the valves 7, 14, 12, 13 remaining closed throughout the recirculation.

After the fourth crushing cycle, the cocoa mass may be discharged and further treated to give chocolate mass, or it may be transferred into a container prior to pressing to give cocoa butter.

If an especially fine cocoa mass for pressing is not required, the mass is passed from the mixer 18 with the help of pump 8 through the open valve 15, line 9, open valve 13, line 21, and open valve 20 into the container preceding the cocoa press, the valves 7, 14, 10, 12, 19 remaining closed.

If an absolutely fine cocoa mass for pressing is required, the cocoa mass must be subjected to a so-called sorting to exclude the fine grains that are present. This sorting is achieved by pumping the mass after the second crushing cycle in the micromill 16 into the container of a sorting machine. Depending on the size and, hence, the sorting output of this machine, several sorting machines may be included. For this purpose, the cocoa mass is pumped by the pump 8 from the mixer 18 through the open valve 15, line 9, open valves 13 and 19, and pipe 27 into the container or storage tank 22, the valves 7, 14, 10, 12, 20 remaining closed. The cocoa mass is spread by the rotation of the cylinder or roller 23 and the degree of fineness achieved is controlled by steel rulers touching the cylinder or roller surface. This fine mass then drops into the storage container 24 from which it is pumped through the open valve 25 and the pump 26 to be subjected to further treatment. The coarse particles remain in the container 22 and after sorting away at least one half of the contents of the container, the coarse particles are pumped back into the container 11 for further crushing. The pumping of the cocoa mass into the container 22 and the discharge of coarse particles are both carried out by the same pump 8 through the same pipe 27. The mouth of the pipe 27 reaches the surface of cylinder or roller 23 and is narrowed so that the pumping off of the mass can be carried out without any particles remaining on the roller. During the removal of the coarse particles, the pump 8 operates, with the valves 19, 14 and 10 being open, while the valves 20, 7, 15, 13 and 12 remain closed. After removal of the coarse particles, the container 22 immediately receives another cocoa mass for sorting, by opening valves 15, 13, 19, with the valves 14, 7, 10, 12, 20 remaining closed.

As soon as the coarse particles, which have again passed through the crushing system, are pumped off, new portions of cocoa mass are directed to the container 22 of the sorting machine so that the mass from the mixer 18 passes through open valve 15, pump 8, open valves 13 and 19 into the container 22 for further sorting, with the valves 7, 14, 10, 12, 20 remaining closed.

The sorting process continues until only an insignificant remainder of coarse particles, which no longer can be reduced in size by the above described process, is left behind. These particles are added to the next portion or they are removed if they contain remnants of husks.

In the crushing systems of both micromills 4 and 16, the mass is intimately contacted with, and oxidized by, the entrained air and the released unpleasantly smelling gases, including acetic acid and water vapors, are sucked out by means of a ventilator. While being strongly crushed and at an elevated temperature, the cocoa mass is brought into contact with the atmospheric oxygen, which produces very favorable conditions. Within a short time, an intensive improvement of flavor and aroma is achieved, which enhances the quality and constitutes a highly meritorious result.

The cocoa mass intended for the manufacture of chocolate mass is pumped from the mixer 18 and passes through open valve 15, pump 8, open valve 12 and line 28 into the mixer 29, with the valves 7, 14, 13 and 10 remaining closed. Simultaneously, the prescribed quantity of powdered sugar, cocoa butter or dried milk is fed through the line 30 into the mixer 29.

The mixture is then partially mixed and pumped through the open valve 32, pump 33, open valve 34, line 35 into the container 36, from where it flows through the open valves 37 and 38 into the two crushing micromills 39 and 40 and thence back into the mixer 29. The valve 41 remains closed. The solid mass, especially the sugar which it contains, is refined by passage through micromills 39 and 40, and pressing the mass through the mills' small sieve openings, having a diameter 1.5–2 mm., produces a swift homogenization of the chocolate mass, strong aerification, and consequently further refinement.

The micromills 4, 16, 39, 40 are all of the same type and size.

The desired degree of homogenization is usually achieved after two or three circulations through the crushing units of the micromills 39 and 40. The chocolate mass is then pumped from the mixer 29 and passes through the open valve 32, pump 33, line 35, and open valve 41 into the mixer 42 of the last machine, with the valve 34 remaining closed. Simultaneously, new cocoa mass is pumped into the mixer 29 in order to ensure the continuity of the process.

The chocolate mass is pumped from the mixer 42 and passed through the open valve 43, pump 44, open valve 45 into the storage containers of the sorting roller 46, with the valves 47 and 48 remaining closed. Again depending on the size and the sorting output of the sorting machine, several of the latter may be included in the production plant. First the container of the sorting machine is filled, and the remaining chocolate mass is passed through the line 49 into the container 50 of the last micromills 52 by opening valve 48 and closing valve 45.

The remainder of the chocolate mass in the container 50 may undergo a further refining operation by being passed through the open valve 51 and the crushing micromill 52 back into the mixer 42.

Simultaneously, the sorting machine containing a sorting cylinder 53 is put into operation and the chocolate mass is spread by the rotating cylinder and by steel rulers sliding on the cylinder surface, which steel rulers control the degree of fineness of the mass. The mass flows then into the storage container 54, from which it is pumped out to pass through the open valve 55 and the pump 56 into the maturing tank. The coarse particles remain in the container 46, and after the sorting of at least half of the contents of the container, the coarse particles are pumped back into the storage container 50 for further crushing.

The filling of the container 46 with chocolate mass and the pumping off of coarse particles is carried out by the same pump 44, using the same terminal pipe 57. The mouth of pipe 57 reaches to the cylinder surface and is narrowed so that the pumping off or removal of the mass can be carried out without any particles remaining on the cylinder. For the pumping off of coarse particles, the pump 44 is put into operation, with the valves 45, 47 and 48 being open, and the valve 43 being closed.

The sorting process continues until only an insignificant remainder of unsorted particles, which cannot be subjected to the described sorting process, is left behind. These particles are then added to the next portion.

The whole production both of the cocoa pulp and the chocolate mass is controlled in accordance with a precisely timed schedule, with individual operations following one after another, to make full use of the capacity of the existing equipment. The process is entirely mechanized, but not continuous, requiring a minimum in space and a minimum number of machines. The sorting of both cocoa and chocolate mass guarantees absolute fineness of the mass and the crushing of the pulp releases cocoa butter from cocoa cells. The size of the solid particles is within the range of 5 to 10 microns. The crushing and simultaneous aerating of the mass in the crushing systems help to quickly remove the unpleasantly smelling volatile substances, and to promote the formation of new aromatic substances and flavors. The time required for the refining and homogenization process is shortened to a minimum by the invention.

Although a particular embodiment of the invention has been described in detail herein with reference to the accompanying drawing, it is to be understood that various changes and modifications can be effected therein without departing from the scope or spirit of the invention, except as defined in the appended claims.

I claim:

1. A method of producing cocoa mass from cocoa nibs comprising the steps of crushing the cocoa nibs by subjecting the latter to the impact energy of violently rotated hammers which heat and liquefy the cocoa nibs to form a cocoa mass in the liquid state, refining the cocoa mass by repeatedly further crushing the particles and providing a large contact surface intimately contacted and oxidized by the entrained air so that the cocoa mass is relatively quickly refined while new characteristic taste and aromatic substances are formed and unpleasant smelling volatile substances including moisture are released from the cocoa mass, and evacuating said volatile substances released from the cocoa mass during the repeated further crushing thereof.

2. A method of producing chocolate mass from cocoa mass derived from cocoa nibs as in claim 1; further comprising adding castor sugar to the cocoa mass following refinement of the latter to form a chocolate mass, repeatedly crushing said chocolate mass by subjecting the latter to violently rotated hammers which further increase the fineness of the solid particles in said chocolate mass, and homogenizing the chocolate mass by passing the chocolate mass through fine openings in an apertured plate following each repeated crushing of the chocolate mass.

3. In a plant for producing cocoa and chocolate mass and having a crushing system; a device comprising a storage tank for receiving a mass from the crushing system, a rotatable cylinder disposed below said storage tank, a container disposed around said cylinder and forming a passageway between said cylinder and said container, means for passing the mass from said tank to said passageway, a wiping knife and a steel ruler mounted longitudinally on the inner surface of said container and adjustable toward and away from said cylinder to determine the fineness of particles of the mass that can pass therebetween while adhering to the surface of the rotated cylinder, said wiping knife removing the relatively fine particles from said cylinder, means for discharging from said passageway the fine particles removed by said wiping knife, and means collecting the remaining relatively coarse particles of the mass from said passageway for further circulation through the crushing system.

References Cited in the file of this patent

UNITED STATES PATENTS

| | | |
|---|---|---|
| 2,520,807 | Marco | Aug. 29, 1950 |
| 2,531,773 | Greer | Nov. 28, 1950 |